United States Patent [19]
Patino

[11] Patent Number: 5,411,816
[45] Date of Patent: May 2, 1995

[54] METHOD AND APPARATUS FOR DETERMINING BATTERY CHARACTERISTICS

[75] Inventor: Joseph Patino, Plantation, Fla.

[73] Assignee: Motorola, Inc., Schaumburg, Ill.

[21] Appl. No.: 193,773

[22] Filed: Feb. 10, 1994

Related U.S. Application Data

[63] Continuation of Ser. No. 908,118, Jul. 2, 1992, abandoned.

[51] Int. Cl.6 .............................................. H02J 7/10
[52] U.S. Cl. .......................................... 429/7; 320/2; 320/22; 320/35; 320/37
[58] Field of Search ................... 429/7; 320/2, 22, 35, 320/37

[56] References Cited

U.S. PATENT DOCUMENTS

| | | | |
|---|---|---|---|
| 4,006,396 | 2/1977 | Bogut | 320/2 |
| 5,164,652 | 11/1992 | Johnson et al. | 320/2 |
| 5,200,686 | 4/1993 | Lee | 320/2 |

Primary Examiner—Mukund J. Shah
Assistant Examiner—Matthew V. Grumbling
Attorney, Agent, or Firm—Pedro P. Hernandez

[57] ABSTRACT

A battery charging system (200) comprises a battery (206) and charger (202). Battery 206 includes a thermistor (112) for determining the temperature of battery (206) and a resistor (214), for informing charger (202) of the current capacity of battery (206). Charger (202) includes a transistor (220) for effectively switching between measuring thermistor (112) and resistor (214) at charger input terminal (240). This effectively reduces the number of battery and charger contacts required as compared to the prior art.

9 Claims, 3 Drawing Sheets

METHOD AND APPARATUS FOR DETERMINING BATTERY CHARACTERISTICS

This is a continuation of application Ser. No. 07/908,118, filed Jul. 2, 1992 and now abandoned.

TECHNICAL FIELD

This invention relates generally to batteries and more specifically to a structure and method for determining battery characteristics.

BACKGROUND

It is very common for batteries which are used in portable communication devices, such as two-way radios, to have a thermistor and a battery capacity resistor. The thermistor is used by a battery charger during the charging of the battery, to determine if the battery is being charged properly. While the capacity resistor is used by the charger to determine the capacity of the battery, prior to the battery being charged. The battery charger upon determining the battery capacity (e.g., 1000 milli-amp-hour mAh) will select the proper charging rate to use, in order to optimally charge the battery.

Referring to FIG. 1, there is shown a prior art battery charging scheme consisting of a charger 102, radio battery 106 and radio 104. Radio 104 contains positive (B+) and negative (B−) battery terminals which are coupled to radio battery 106 via battery contacts 116 and 114, respectively. Battery 106 contains one or more battery cells 108, which determine the voltage and current capacity of battery 106. Also included as part of the battery 106, are protection diode 118, a battery temperature indicator such as thermistor (Rt) 112 and a battery capacity indicator, such as resistor (Rc) 110.

Charger 102 consists of a charger monitor circuit 128, which can consist of a well known microprocessor or microcontroller as known in the art and appropriate control software. Charger monitor circuit 128 controls charger control circuit 130 which provides current to battery 106 in order to charge the battery. A control signal is transmitted by charger monitor circuit 128 to charger control circuit 130 via bus 140, the control signal informs charger control circuit 130 on how much current to source via line 129 to battery 106.

Charger monitor circuit 128 contains three analog to digital (A/D) ports 120, 122 and 124. A/D port 120 monitors the voltage on the B+ line. A/D port 122 senses the resistance of capacity resistor Rc 110 and A/D port 124 in turn senses the resistance of thermistor Rt 112, as its resistance changes once the battery begins charging. A/D ports 122 and 124 include external pull-up resistors which are used to determine the resistance of Rc 110 and Rt 112, by determining the voltage level at A/D ports 122 and 24, respectively.

Charger 102 and battery 106 in the prior art scheme are required to have 4 lines connecting the charger 102 and battery 106. These lines being B+ line 132 which provides the current to the battery, Rc line 134 which is used to sense the capacity resistor 110, thermistor sense line 136 used to sense the resistance value of thermistor 112, and B− (ground) line 138.

The problem with the prior art battery charging and sensing scheme is that the charger requires 4 contacts and the battery requires 4 contacts, in order for the battery and charger to mate with each other (lines 132–138) and perform all the required functions. Battery charger contacts tend to be expensive, given that they are usually movable finger contacts which are typically gold plated in order to provide good electrical connection to battery 106. The battery contacts also tend to be gold plated. A need thus exists for a method and apparatus that can accomplish the battery characterization functions (e.g., battery temperature and capacity determinations) performed by the prior art battery scheme, while reducing the number of battery contacts that are utilized to accomplish the required functions.

SUMMARY OF THE INVENTION

Briefly, according to the invention, a method for determining first and second battery characteristics is described. A battery charger having an input terminal and a switching device determines the first battery characteristic by turning the switching device off and determining the first battery characteristic at the charger input terminal. The charger determines the second battery characteristic by turning the switching device on; and determining the second battery characteristic at the charger input terminal.

DETAILED DESCRIPTION OF THE PREFERRED EMBODIMENT

Figure 2:
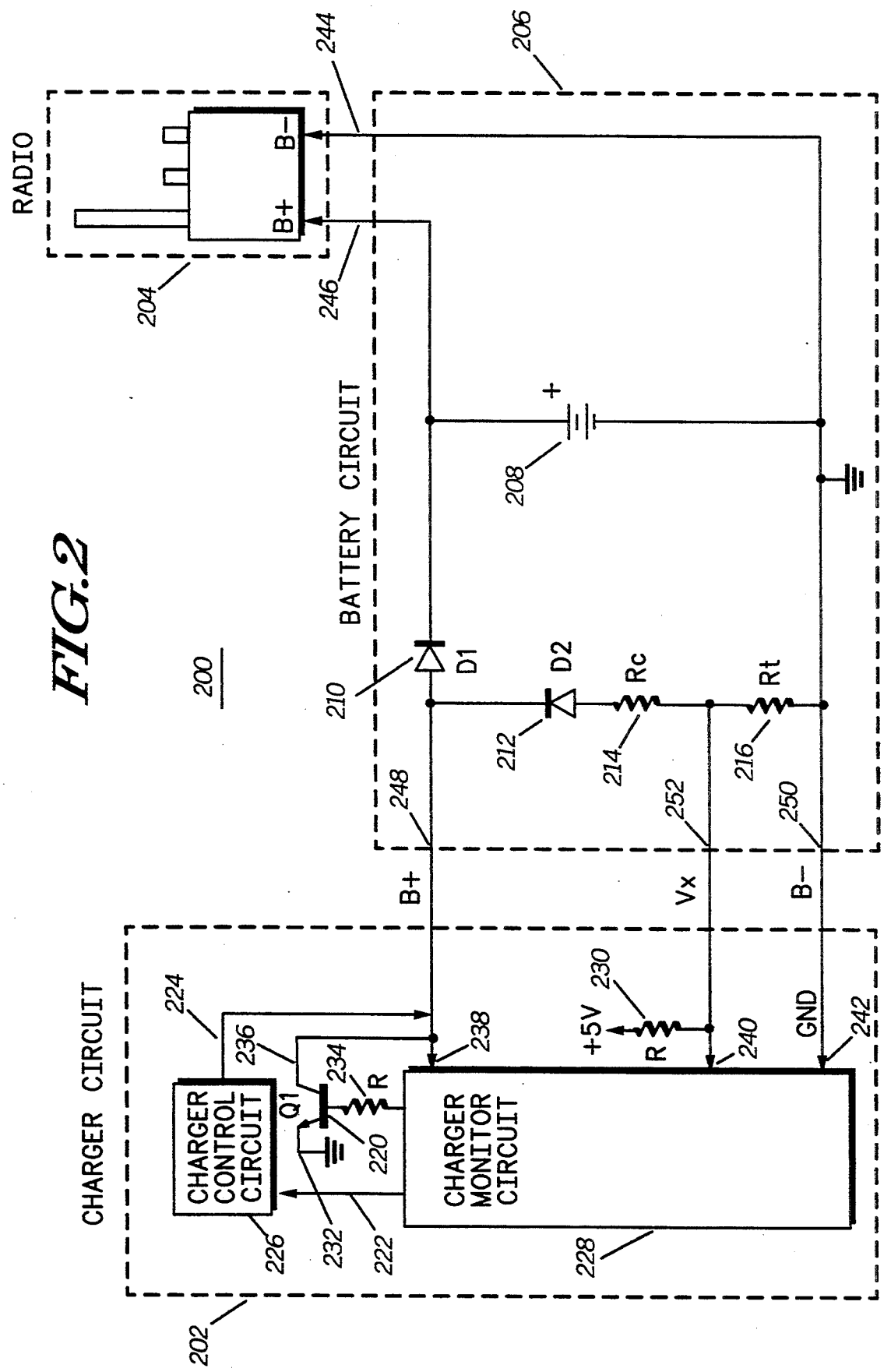
FIG. 2 is a battery charging system in accordance with the present invention.

Referring now to the drawings and in particular to FIG. 2, there is shown a battery charging system 200 in accordance with the present invention. Charging system 200 comprises a battery charger 202, a battery such as radio battery 206, and a battery operated communication device such as radio 204. Radio 204 includes positive and negative (B+ and B−) terminals which are coupled to battery 206 via battery contacts 246 and 244.

Battery 206 comprises one or more battery cells 208 which dictate the voltage and storage capacity for battery 206. For example, a radio battery can be designed depending on the number of battery cells used, to have an operating voltage of 7.5 volts and a storage capacity of 1500 milli-amp-hours (mAh). Battery 206 includes three battery charging contacts, first battery contact 250, second battery contact 252 and third battery contact 248. Battery contact 248 is the B+ (positive) terminal for battery 206, contact 250 is the B− or ground contact, and contact 252 is the Vx or sensing contact.

Coupled between contact Vx 252 and ground contact 250 is a first battery characterization device such as thermistor Rt 216 which changes resistance as the temperature of battery 206 changes. The temperature of battery 206 typically increases as the battery is being charged, with an abnormally high temperature indicating that the battery is being charged too rapidly.

Thermistor 216 thermally protects battery 206 during charging, by informing charger 202 of the approximate temperature of battery 206. Coupled between the B+ battery contact 248 and Vx contact 252, is a second battery characterization device such as capacity resistor Rc 214, and diode (D2) 21 2. Finally, coupled between battery contact B+ 248 and the positive terminal of battery cells 208 is found a reverse current protection diode (D1) 210. Diode (D1) 210 protects battery cells 208 from being drained by battery charger 202.

Charger 202 comprises a charger monitor circuit or controller 228, which can be a well known microcontroller or microprocessor as known in the art. Charger 202 also includes a charger control circuit 226, which acts as a programmable current source which sources current to battery 206. Controller 228 informs charger control circuit 226 how much current to source to battery 206 via a control signal sent via bus 222. Once informed to source current, charger control circuit 226 begins sending current via line 224 to the positive B+ battery contact 248 of battery 206.

Charger 202 further comprises a switching means which can take the form of a NPN transistor Q1 220, or other type of switching device. The base of transistor 220 is coupled to controller 228 via resistor 234. The emitter 232 of transistor 220 is coupled to ground, while the collector terminal 236 is coupled to the B+ line.

When battery 206 requires charging, battery 206 is mated with charger 202. Once mated together, contacts 248, 250 and 252 mate with charger terminals 238, 240 and 242 of charger 202, respectively. Terminals 238 and 240, are analog-to-digital (A/D) input terminals which are part of controller 228. Terminal 238 senses the voltage level of battery 206 while input terminal 240 determines the resistance of Rc 214 or the resistance of thermistor Rt 216. Terminal 240 includes a conventional pull-up resistor 230 in order to determine the resistance of Rc 214 and Rt 6 by measuring the voltage at input terminal 240.

With the present invention, with either current is being sent to battery 206 from charger control circuit 226 (battery being charged) or when no current is being sent to battery 206 (no charging is taking place), and transistor Q1 220 is in a first state where transistor 220 is not operating (open or off), one can determine the value of Rt 216 at A/D terminal 240 by the following calculation:

$$Vx = (5 \text{ volts} * Rt)/(Rt + R \text{ pull up resistor})$$

solving for Rt yields, $$Rt = \frac{Vx * R \text{ pull-up}}{5 - Vx}$$

where Vx is the voltage at terminal Vx 252 (input terminal 240 to controller 228).

With the current from charger control circuit 226 to battery 206 disabled, and transistor 220 switched to a second state ("on" or closed condition) one can solve for the value of Rc 214, as measured at terminal 240 as follows:

$$i = i1 + i2$$

where i1 is equal to the current flowing through thermistor Rt 216 to ground, from pull-up resistor R. While i2 is equal to the current flowing from pull-up resistor R, through Rc 214 and diode D2 (212) to ground. Given that A/D input terminal 240 is characterized by very high impedance, minimal current will flow into input 240, and therefore this current can be disregarded in the calculations.

$$i = (5 - Vx)/(R \text{ pull up})$$

$$i1 = (Vx)/(Rt)$$

$$i2 = (Vx - 0.6)/(Rc),$$

solving for Rc yields, $$Rc = \frac{Vx - 0.6}{\frac{5 - Vx}{R \text{ pull up}} - \frac{Vx}{Rt}}$$

Figure 3:
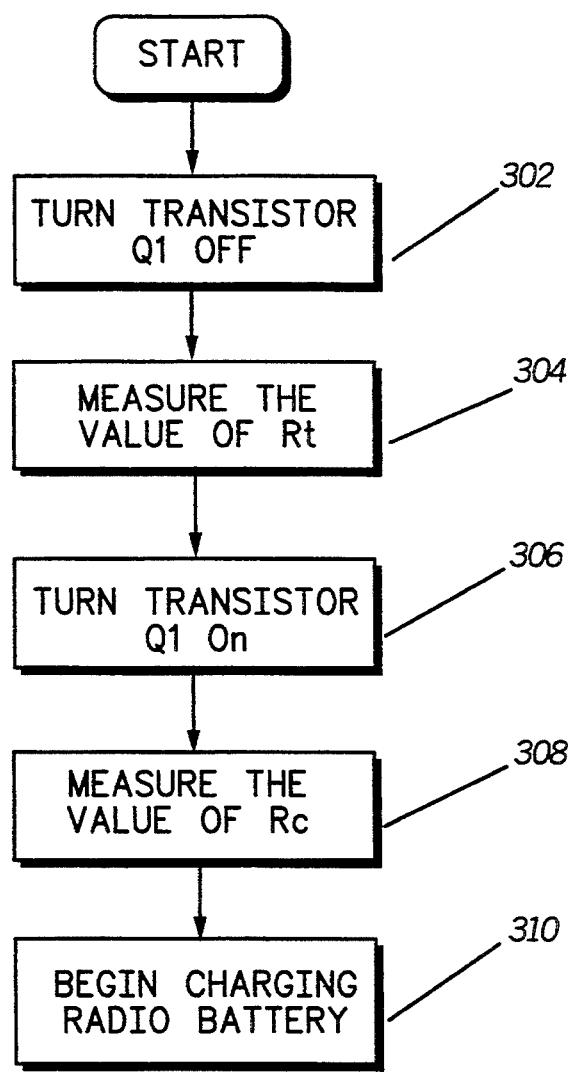
FIG. 3 is a flow chart showing the typical steps performed by the present invention.

In FIG. 3, the steps that are usually performed when charging battery 206 by charger 202 are shown. In step 302, charger monitor circuit 228 makes sure that transistor (Q1) 220 is turned off. Then in step 304, the value of Rt 216 is measure by A/D input 240. Charger monitor circuit 228 then turns on transistor 220 in step 306, and in step 308 the value of Rc 214 is measured at terminal 240. Turning transistor 220 "on" causes B+ battery contact 248 to ground. Protection diode (D1) 210 protects battery cells 208 from the shorting of B+ terminal 248. However, the shorting of terminal 248 places the capacity resistor (Rc) 214 and diode (D2) 212 in parallel with thermistor (Rt) 216. Once the values of Rc and Rt have been determined, charger monitor circuit 228 directs charger control circuit 226 to begin charging battery 206 in step 310, at the rate specified by charger monitor circuit 228 via bus 222.

During charging, charger monitor circuit 228 can determine the resistance value of thermistor 216 in order to determine the temperature of battery 206 at any given point in time (charging does not have to be stopped in order to determine the thermistor value). Once the temperature is determined, the charge rate can be modified or stopped as is known in the art.

The flowchart shown in FIG. 3 could be modified by beginning to charge the radio battery as soon as the battery capacity (Rc) is determined and the transistor is turned off. This procedure would save time by beginning to charge the battery as soon as possible. Since the value of thermistor (Rt) 216 can be determined, even while the battery is being charged By monitoring the voltage at input terminal 240 charger monitor circuit 228 can determine if a battery has been attached to charger 202. If no battery is coupled to charger 202, the voltage at input terminal 240 will approximate 5 volts, while if a battery is attached, the voltage at input terminal 240 will drop by the resistance divider created by pull-up resistor (R) and thermistor 216. By knowing when a battery is first inserted into charger 202, the charger can commence the sequence of determining the resistance's of Rc 214 and Rt 216. Given that Rc does not vary in value, it is only required to measure it once prior to charging starting.

Figure 1:
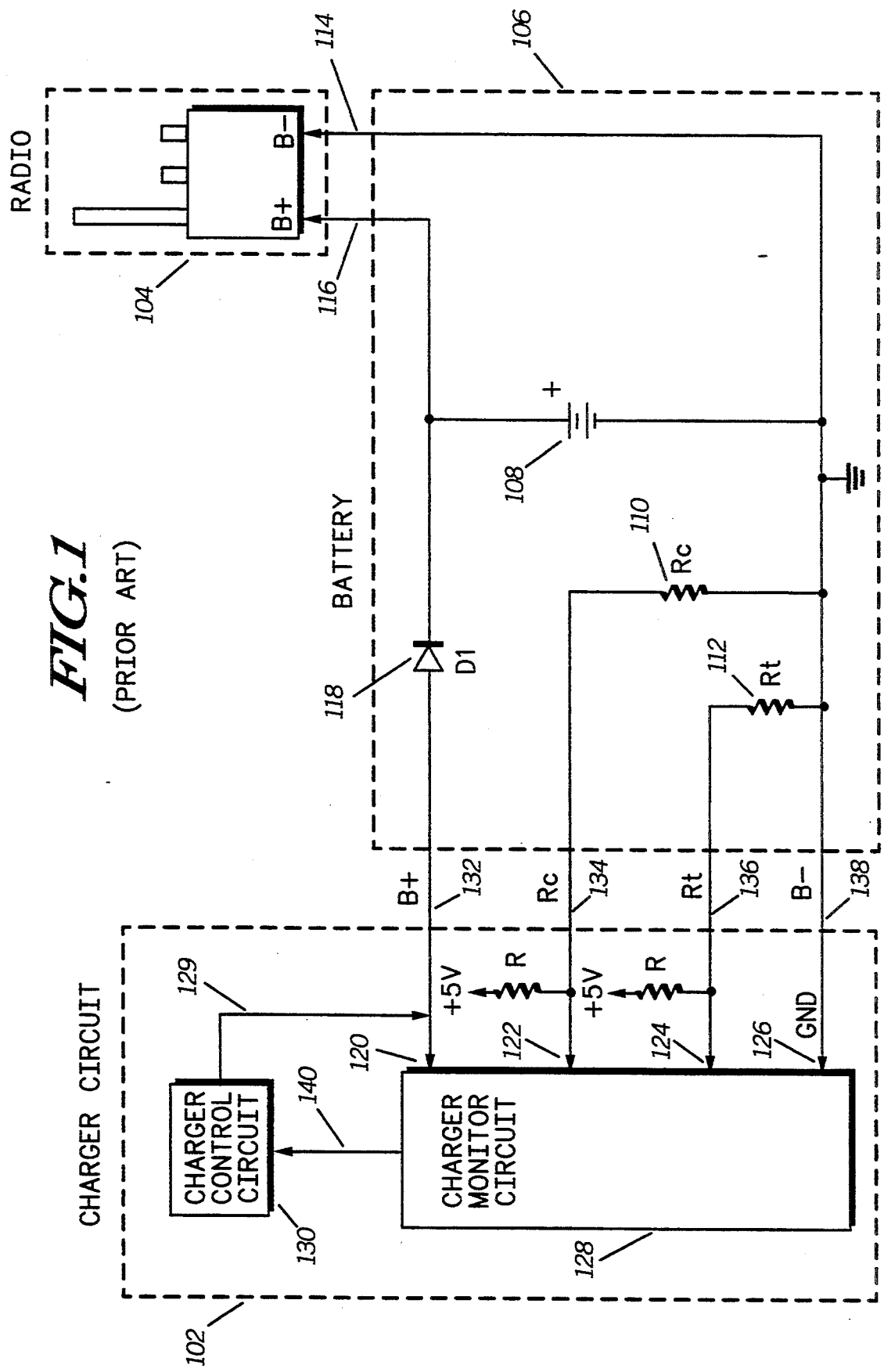
FIG. 1 is a schematic of a prior art battery charging system.

In summary, the present invention provides for a way of determining both the temperature and battery capacity (size) of a battery 206 using one input terminal (terminal 240) at charger 202 instead of two as the prior art design of FIG. 1. The present invention provides for a way of minimizing the number of battery contacts required, as well as reducing the number of contacts required at the battery charger. A cost reduction in manufacturing of both battery 206 and charger 202 is achieved, as well as a reduction in the number of parts that can become defective. This in effect increases the overall product quality for both battery 206 and charger 202.

What is claimed is:

1. A method for determining first and second battery characteristics of a battery using a charger having an input terminal, the battery including first, second and third battery contacts and a diode having an anode and a cathode, the anode of the diode being electrically coupled to the second battery contact and the cathode of the diode being electrically coupled to the third battery contact, the method comprising the steps off:

determining the first battery characteristic at the charger input terminal;

forward biasing the diode in order to place the third battery contact at substantially the same voltage potential as the first battery contact; and determining the second battery characteristic independently of the first battery characteristic at the charger input terminal.

2. A method as defined in claim 1, wherein the step of determining the first battery characteristic comprises determining the resistance of a temperature varying device in order to determine the temperature of the battery.

3. A method as defined in claim 1, comprising the further step of:

charging the battery with the charger after the first and second battery characteristics have been determined.

4. A method as defined in claim 1, further comprising the step of:

determining if the battery has been attached to the charger by determining the voltage at the charger input terminal.

5. A method as defined in claim 2, wherein the step of determining the second battery characteristic comprises determining the resistance of a resistive device in order to determine the capacity of the battery.

6. A method as defined in claim 4, further comprising the step of:

charging the battery with the battery charger; and determining the first battery characteristic at the charger input terminal.

7. A portable battery, comprising:

first, second and third battery contacts;

a first battery characterization device coupled between the first and second battery contacts;

a second battery characterization device having first and second terminals, the first terminal coupled to the second battery contact;

a first diode having an anode and a cathode, the anode coupled to the second terminal of the second battery characterization device, the cathode coupled to the third battery contact;

at least one battery cell having a positive and negative terminal, the negative battery cell terminal coupled to the first battery contact; and a second diode having an anode and a cathode, the anode coupled to the third battery contact and the cathode coupled to the positive battery cell terminal.

8. A battery as defined in claim 7, wherein the first battery characterization device is a temperature varying device and the second battery characterization device is a resistor.

9. A battery as defined in claim 8, wherein the temperature varying device is a thermistor.

* * * * *